March 22, 1960      T. W. SPAETGENS      2,929,592
VIBRATION MOUNTING

Filed Feb. 25, 1958      2 Sheets-Sheet 1

INVENTOR
THEODORE W. SPAETGENS
BY
Fetherstonhaugh & Co.
ATTORNEYS

March 22, 1960 T. W. SPAETGENS 2,929,592
VIBRATION MOUNTING
Filed Feb. 25, 1958 2 Sheets-Sheet 2
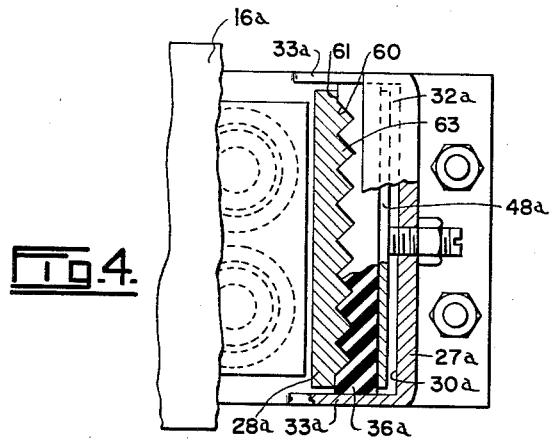
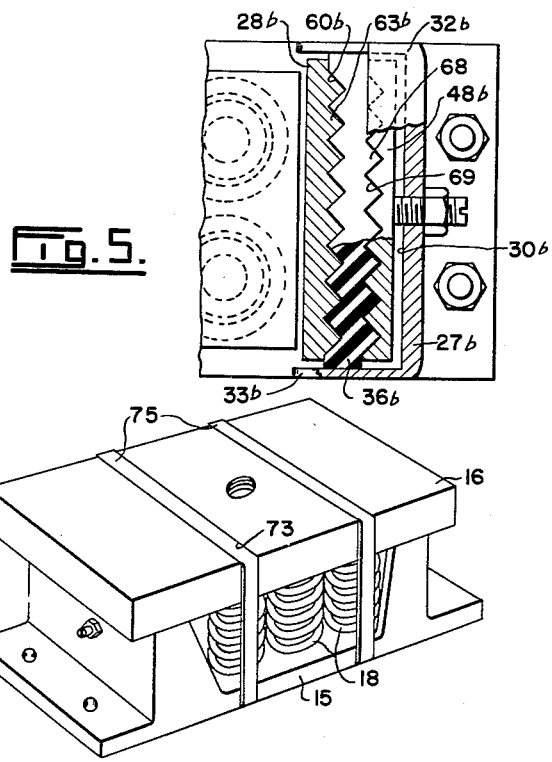
INVENTOR
THEODORE W. SPAETGENS
BY
Fetherstonhaugh & Co.
ATTORNEYS

United States Patent Office 2,929,592
Patented Mar. 22, 1960

2,929,592

VIBRATION MOUNTING

Theodore W. Spaetgens, South Burnaby, British Columbia, Canada

Application February 25, 1958, Serial No. 717,487

17 Claims. (Cl. 248—21)

This invention relates to improvements in mountings for equipment, such as machinery, to prevent vibration transmission from the latter to the foundation or base upon which it is mounted, or vice versa.

An object of the present invention is the provision of a mounting for equipment which is subject to vibration, said mounting resiliently supporting the equipment or a portion thereof, and including means for preventing vibrations in horizontal and vertical planes from being transferred from the equipment to the foundation thereof, or from the latter to the equipment.

A vibration mounting according to the present invention for equipment subject to vibrations during use having a base to be mounted on a foundation, includes spaced and substantially parallel members projecting upwardly from the foundation and downwardly from the equipment base, the upwardly-projecting member terminating short of the base and the downwardly-projecting member terminating short of the foundation, a resilient damping pad fitting between the parallel members and extending the width thereof, means on one of the members constraining the pad against lateral and vertical displacement, said pad having a vertical recess therein facing the other member, and a vertical tongue on and projecting from said latter member fitting snugly in the pad recess, a portion of the pad lying between the outer part of the tongue and the member opposite said tongue. In the preferred form of the invention, these parallel members project upwardly from a bottom plate and downwardly from a top plate, respectively, and the mounting spring means between said top and bottom plates forming the sole supporting means of the former.

Figure 1:
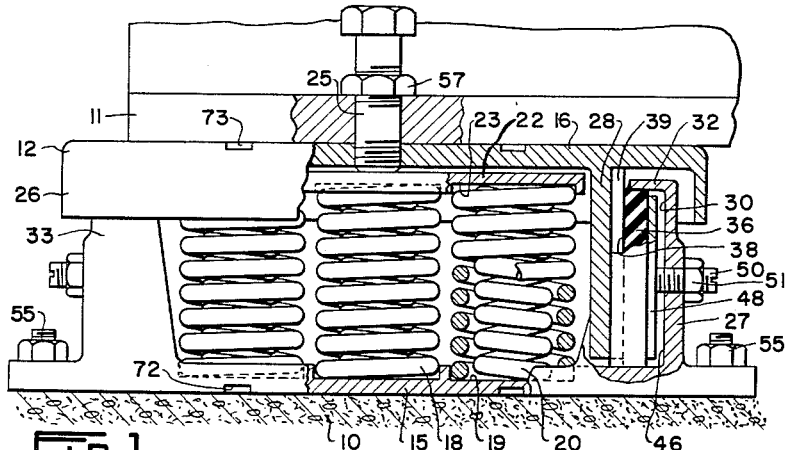
Figure 2:
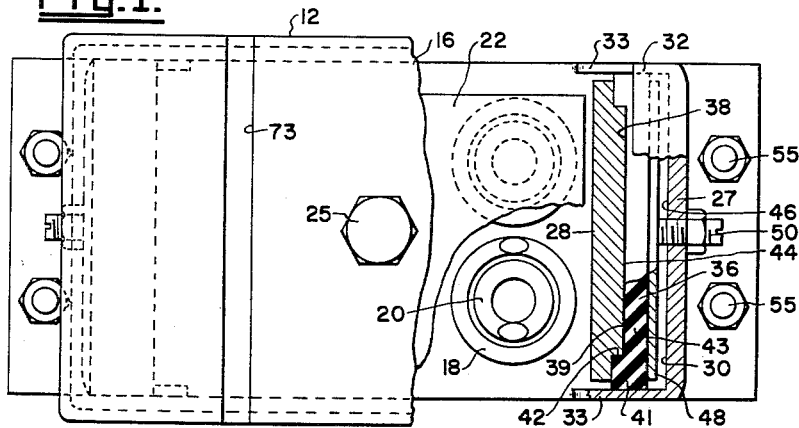
Figure 3:
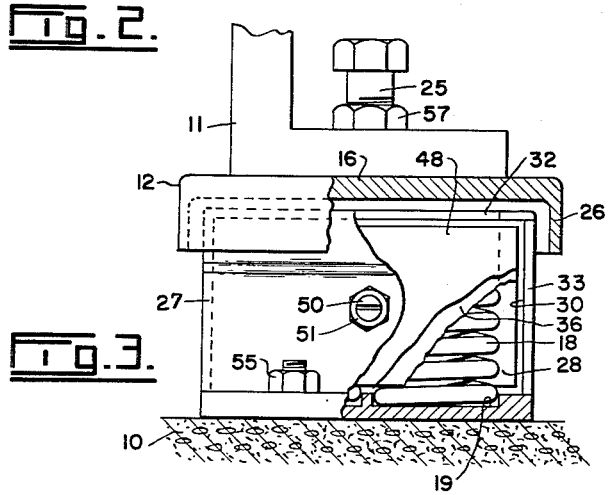

An example of this invention is illustrated in the accompanying drawings, in which, Figure 1 is a side elevation of one form of vibration mounting, part of the latter being in section, Figure 2 is a plan view, partly in section, of the device, Figure 3 is an end elevation of the mounting, partly in section, Figure 4 is a view similar to Figure 2 of one end of an alternative form of vibration mounting, Figure 5 is a view similar to Figure 4 of still another form of mounting, and Figure 6 is a reduced perspective of a vibration mounting ready to be installed for use.

Referring to the drawings, 10 is a foundation upon which a piece of equipment or machinery is to be mounted, a portion of the latter being illustrated at 11. One or more vibration mountings 12 is or are positioned between the base of the equipment and the foundation in order to prevent vibrations created by the equipment from reaching the foundation. Usually, there are several of these mountings between the piece of equipment and the base, but as the mountings are identical, one only is illustrated and described herein.

The illustrated form of the invention includes a bottom plate 15 and a top plate 16 spaced thereabove. Spring means is provided between these plates, and serves as the sole support of the top plate and its load. One or more coil springs 18, several being shown, standing on end extend upwardly from the bottom plate, said plate having a socket 19 in its upper surface for each spring. If desired, each spring 18 may have a smaller inner spring 20 therein. The springs may extend up to the top plate, but it is preferable to provide a horizontal compression plate 22, said plate having a socket 23 on its lower surface for each spring. The compression plate rests on the springs, and one or more bolts 25, one only being shown in the drawings, is or are threaded through the top plate 16 and bears against the compression plate. When one bolt only is used, it is located centrally of the plate. The plate 16 may have a peripheral skirt 26 depending from its four edges.

Spaced and substantially parallel members 27 and 28 project upwardly and downwardly from the bottom and top plates, respectively, at each end of the mounting 12, and terminate short of the other plate, as clearly shown in Figure 1. As the construction is the same at both ends of the mounting, only one will be described herein.

Either of the parallel members 27 or 28 is provided with a large recess therein facing the other member. In this example, the outer member 27 is formed with a large recess 30 in its inner surface facing the inner member 28. This recess is formed by a top flange 32 along the upper edge of the member, side flanges 33 extending along the side edges of the member, and the bottom plate 15. By referring to Figures 2 and 3, it will be seen that member 27 is wider than member 28. The side flanges 33 of the outer member overlap the side edges of the inner member 28 and are spaced outwardly a little therefrom.

A resilient damping pad 36 formed of suitable material, such as rubber or the like, fits snugly within recess 30. Top flange 32 and side flanges 33 prevent the pad from shifting laterally or vertically. This pad projects outwardly from the recess and bears against the adjacent face of the inner member 28, see Figures 1 and 2. The pad is formed with a large recess 38 in its inner face extending from the top to the bottom thereof and facing the member 28, and the latter has a tongue 39 on and projecting outwardly from its outer face the same width and shape as the pad recess and fitting in the latter. The tongue extends from a point near the bottom of the pad at least to the top thereof. By referring to Figures 1 and 2, it will be seen that the recess in the damping pad is of such size that it forms a block 41 at each side edge of the pad which bears against side 42 of the tongue end against the inner surface of side flange 33, a portion 43 of the pad lies over the outer surface 44 of the tongue.

The damping pad 36 may bear against the bottom 46 of recess 30, said bottom being the inner surface of member 27, but it is preferable to provide a pressure plate 48 in the recess bearing against the pad. This plate is spaced a little from the recess bottom 46, and it is almost the same size, but not quite, as the pad. An adjusting screw 50 is threaded through the member 27 centrally thereof and bears against the pressure plate to move it against the resilient damping pad. A lock nut 51 may be threaded on the outer end of the adjusting screw.

It is preferable, although not absolutely necessary, to stick the pad to the pressure plate with adhesive, or if the plate is not used, to stick the pad to the bottom of the outer member recess.

The bottom plate 15 may be mounted on the foundation 10 and the top plate 16 secured to the base of equipment 11. In this example, nuts and bolts 55 connect the bottom plate to the foundation, while bolt 25 extends through the equipment base, and a nut 57 threaded thereon secures the base to the top plate.

In operation, the weight of the equipment 11 supported by the mounting 12 rests upon the top plate 16 which is supported solely by the springs 18, and springs 19, if the latter are used. These springs isolate the vertical vibrations of the equipment.

The damping pads 36 offer non-rigid restraint to horizontal movement of the supported machine, thus permitting the mounting to have lateral stability and permitting the coil springs by virtue of their inherent horizontal flexibility to isolate horizontal vibration as well as vertical. The degree of pressure exerted on the pads by the adjustable screws 50 can be chosen to provide in any instance the optimum amount of friction and hysteresis damping to provide suitable control of amplitudes during traversal of resonant zones and to effect quick arrestment of motion after impacts and shocks.

The design of the pads and the abutment members provides for restraint of both longitudinal and lateral motion as well as stability in both of these directions.

When the vibration mounting is in use, the top flanges 32 and side flanges 33 and bottom plate 15 prevent the damping pads from shifting laterally or vertically. As tongues 39 project into and fit snugly within the recesses of the pads, the pads resist lateral movement of the top plate and equipment mounted thereon. The portion of the pads between the outer surfaces of the tongues and the pressure plates 48 restrain longitudinal movements of the top plate.

Figure 4 illustrates an alternative form of damping pad with a different tongue and recess arrangement from that of Figures 1 to 3. The damping pad 36a is confined within the recess 30a of the outer member 27a. However, instead of having a single large recess, this pad has a plurality of small recesses 60 formed in its inner face 61, said recesses being positioned side by side and extending across the pad. Each recess may have any desired cross sectional shape, those in Figure 4 being V-shaped in section, and preferably extends from the bottom to the top of the pad. The inner surface of member 28a is formed with a plurality of tongues 63 on its inner surface extending to the height thereof. There is a tongue for each recess 60 of the damping pad, and each tongue corresponds in shape and size to a recess, and fits snugly therein.

The vibration mounting of Figure 4 functions in the same manner as that of Figures 1 to 3. The top flanges 32a and the side flanges 33a and the bottom plate prevent lateral and vertical displacement of pad 36a, while the tongues 63 and recesses 60 cause the pad to restrain lateral movement of the top plate 16a. The pad itself dampens longitudinal movement of the top plate.

Figure 5 illustrates a variation of the pad and tongue arrangement of Figure 4. The inner member 28b is formed with the tongues 63b which fit into the recesses 60b of damping pad 36b. This damping pad has a plurality of tongues 68 on its outer surface fitting snugly within correspondingly-shaped recesses 69 formed in the inner surface of the pressure plate 48b. The latter tongues and recesses may be the same shape as the tongues and recesses of the other side of the pad and member 28b, as shown, or they may have any other desired cross sectional shape.

The vibration mounting of Figure 5 functions in the same manner as that of Figure 4. However, the tongue 68 and recesses 69 of the damping pad and the pressure plate respectively help to dampen the lateral movement of the top plate and the equipment secured thereto. The top flange 32b and side flanges 33b prevent lateral or vertical displacement of the damping pad, while the latter dampens the longitudinal movement of the top plate.

Figure 6 illustrates any one of the previously-described vibration mountings, but for the sake of convenience, it will be considered to be that of Figures 1 to 3. The bottom plate 15 and top plate 16 are formed with aligned transverse grooves 72 and 73 in their bottom and top surfaces, respectively. These grooves are provided in order that metal straps 75 may extend around the mounting within these grooves, as clearly shown in Figure 6. When fastened, the straps hold the various parts of the unit together during shipment and when the mounting is being put into place under a piece of equipment. The method of applying and securing straps of this nature is well known, and does not need any description herein. If desired, springs 18 and 20 may be placed under compression at the time the straps are applied to the unit in order to make the installation of the mounting easier than would otherwise be the case.

What I claim as my invention is:

1. In a vibration mounting for equipment subject to vibrations during use and having a base to be mounted on a foundation, pairs of spaced and substantially parallel members, one pair of said members projecting upwardly from a foundation and one pair of said members projecting downwardly from an equipment base, the upwardly-projecting members terminating short of the base and the downwardly-projecting members terminating short of the foundation, a large recess in each of one pair of said members, each recess facing one of the other pair of members, a resilient damping pad fitting within each recess and extending between the parallel members across the width thereof, means on each of one pair of members constraining the pads against lateral and vertical displacement, each of said pads having a vertical recess therein facing one of the other pair of members, and a vertical tongue on and projecting from each of said latter members fitting snugly in an opposed one of the pad recesses, a portion of each pad lying between the outer part of the tongue and the member opposite said tongue.

2. In a vibration mounting for equipment subject to vibrations during use and having a base to be mounted on a foundation, pairs of spaced and substantially parallel members, one pair of said members projecting upwardly from a foundation and one pair of said members projecting downwardly from an equipment base, the upwardly-projecting members terminating short of the base and the downwardly-projecting members terminating short of the foundation, a large recess in each of one pair of said members, each recess facing one of the other pair of members, a resilient damping pad fitting within each of said recesses and extending between the parallel members and across the width thereof, means on each of one pair of members constraining the pads against vertical displacement, vertical side flanges on the edges of the same members overlapping the edges of the pads and one of the other pair of members, the edges of the latter members being spaced from the side flanges, each of said pads bearing at its side edges against the flanges and having a vertical recess therein facing one of the members with its edges spaced from each of the flanges, and a vertical tongue on and projecting from said latter members fitting snugly in an opposed one of the pad recesses.

3. In a vibration mounting for equipment subject to vibrations during use and having a base to be mounted on a foundation, pairs of spaced and substantially parallel members, one pair of said members projecting upwardly from a foundation and one pair of said members projecting downwardly from an equipment base, the upwardly-projecting members terminating short of the base and the downwardly-projecting members terminating short of the foundation, a large recess in each of one pair of said members, each recess facing one of the other pair of members, a resilient damping pad fitting snugly within each of said recesses and projecting outwardly therefrom to bear against an opposed one of the other pair of members, each of said pads having a vertical recess therein facing one of the other pair of members, and a vertical tongue on each of said other members fitting snugly in an opposed one of the pad recesses, a portion of each pad lying between the outer part of the tongue and the member opposite said tongue.

4. A vibration mounted as claimed in claim 3 in which the recesses are formed in the upwardly-projecting members and the tongues are formed on the downwardly-projecting members.

5. A vibration mounting as claimed in claim 3 including a pressure plate in each of the member recesses between the associated damping pad and said member, and means in each of the recessed members for moving the pressure plate to compress the pad.

6. A vibration mounting as claimed in claim 5 in which each recessed member has vertical sides projecting therefrom and overlapping and spaced from the vertical edges of one of the other pair of members, said sides helping laterally to confine the damping pads against displacement.

7. In a vibration mounting for equipment subject to vibrations during use and having a base to be mounted on a foundation, a bottom plate to be secured to a foundation, a top plate to be secured to an equipment base spaced above and substantially parallel with the bottom plate, spring means between said top and bottom plates forming the sole supporting means of the former, pairs of spaced and substantially parallel members projecting upwardly and downwardly respectively from the bottom and top plates and terminating short of the plates, a large recess in each of one pairs of members facing one of the other pair of members, a resilient damping pad fitting snugly within each recess and projecting outwardly therefrom to bear against the opposed one of the other pair of members, each pad having a vertical recess therein facing the opposed one of the other pairs of members, and a vertical tongue on each said other pair of members fitting snugly in the pad recess, a portion of each pad lying between the outer part of the tongue and the member opposite said tongue.

8. A vibration mounting as claimed in claim 7 in which the recesses are formed in the upwardly-projecting members and the tongues are formed on the downwardly-projecting members.

9. A vibration mounting as claimed in claim 7 including a pressure plate in each of the member recesses against the associated resilient pad, and means for moving the pressure plate to compress the pad.

10. A vibration mounting as claimed in claim 9 in which each of the recessed members has vertical side flanges extending from its outer end down to the bottom plate, said flanges projecting outwardly from said member past the vertical edges of the opposed one of the other pair of members and spaced outwardly a little therefrom, said flanges helping laterally to confine the damping pads against displacement.

11. In a vibration mounting for equipment subject to vibrations during use and having a base to be mounted on a foundation, pair of spaced and substantially parallel members projecting upwardly from a foundation and downwardly from an equipment base respectively, the upwardly-projecting members terminating short of the base and the downwardly-projecting members terminating short of the foundation, a large recess in each of one pair of members, each recess facing one of the other pair of members, a resilient damping pad fitting within each recess between the parallel members and extending the width thereof, means on each of one pair of the members constraining the pads against lateral and vertical displacement, each of said pads having a plurality of vertical recesses side by side across the width thereof facing one of the other pair of members, and a vertical tongue on and projecting from each of said latter member for and fitting snugly in each pad recess, a portion of the pad lying between the outer part of the tongue and the member opposite said tongue.

12. In a vibration mounting for equipment subject to vibrations during use and having a base to be mounted on a foundation, pairs of spaced and substantially parallel members projecting upwardly from a foundation and downwardly from an equipment base respectively, the upwardly-projecting members terminating short of the base and the downwardly-projecting members terminating short of the foundation, a large recess in each of one pairs of members, each recess facing one of the other pairs of members, a resilient damping pad fitting snugly within each recess and projecting outwardly therefrom to bear against an opposed one of the other pair of members, each of said pads having a plurality of vertical recesses side by side across the width thereof facing one of the other members, and a vertical tongue on and projecting from said latter member for and fitting snugly in each pad recess, a portion of the pad lying between the outer part of the tongue and the member opposite said tongue.

13. In a vibration mounting for equipment subject to vibrations during use and having a base to be mounted on a foundation, a bottom plate to be secured to a foundation, a top plate to be secured to an equipment base spaced above and substantially parallel with the bottom plate, spring means between said top and bottom plates forming the sole supporting means of the former, pairs of spaced and substantially parallel members projecting upwardly and downwardly respectively from the bottom and top plates and terminating short of the plates, a large recess in each of one pair of members facing one of the other pair of members, a resilient damping pad fitting snugly wthin each recess and projecting outwardly therefrom to bear against an opposed one of the other pair of members, each of said pads having a plurality of vertical recesses side by side across the width thereof facing the other member, and a vertical tongue on and projecting from said latter member for and fitting snugly in each pad recess, a portion of the pad lying between the outer part of the tongue and the member opposite said tongue.

14. In a vibration mounting for equipment subject to vibrations during use and having a base to be mounted on a foundation, pairs of spaced and substantially parallel members projecting upwardly from a foundation and downwardly from an equipment base respectively, the upwardly-projecting members terminating short of the base and the downwardly-projecting members terminating short of the foundation, a large recess in each of one pair of members facing one of the other pair of members, a resilient damping pad fitting snugly within each recess and projecting outwardly therefrom to bear against an opposed one of the other pair of members, a pressure plate in each recess between the damping pad and the recessed member, and means in each recessed member for moving the pressure plate to compress the pad, each of said pads having a plurality of vertical recesses in the face thereof opposite the pressure plate side by side across its width facing one of the other pair of members.

15. A vibration mounting as claimed in claim 14 in which the adjacent frame of each damping pad and its associated pressure plate have snugly interfitting vertical recesses and tongues for preventing lateral relative movement therebetween.

16. In a vibration mounting for equipment subject to vibrations during use and having a base to be mounted on a foundation, a bottom plate to be secured to a foundation, a top plate to be secured to an equipment base spaced above and substantially parallel with the bottom plate, spring means between said top and bottom plates forming the sole supporting means of the former, pairs of spaced and substantially parallel members projecting upwardly and downwardly respectively from the bottom and top plates and terminating short of the plates, a large recess in each of one pair of members facing one of the other pair of members, a resilient damping pad fitting snugly within each recess and projecting outwardly therefrom to bear against an opposed one of the other pair of members, a pressure plate in each recess between the damping pad and the recessed member, and means in each recessed member for moving the pressure plate to compress the pad, each of said pads having a plurality of vertical recesses in the face thereof opposite the pressure plate side by side across its width facing one of the other pair of members.

17. A vibration mounting as claimed in claim 16 including snugly interfitting vertical recesses and tongues on the adjacent faces of each damping pad and its pressure plate, said interfitting recesses and tongues preventing lateral relative movement between said pad and plate.

References Cited in the file of this patent

UNITED STATES PATENTS

| | | |
|---|---|---|
| 1,691,723 | Keys | Nov. 13, 1928 |
| 1,734,596 | Rosenzweig | Nov. 5, 1929 |
| 2,466,480 | Rosenzweig | Apr. 5, 1949 |
| 2,587,418 | Wahlberg | Feb. 26, 1952 |
| 2,823,882 | Ross | Feb. 18, 1958 |

FOREIGN PATENTS

| | | |
|---|---|---|
| 282,188 | Great Britain | Dec. 22, 1927 |